US008917760B2

(12) United States Patent
Toon

(10) Patent No.: US 8,917,760 B2
(45) Date of Patent: Dec. 23, 2014

(54) MANUFACTURING PROCESS

(75) Inventor: Nigel Toon, Taunton (GB)

(73) Assignee: Nvidia Corporation, Santa Clara, CA (US)

( * ) Notice: Subject to any disclaimer, the term of this patent is extended or adjusted under 35 U.S.C. 154(b) by 546 days.

(21) Appl. No.: 13/265,812

(22) PCT Filed: Apr. 13, 2010

(86) PCT No.: PCT/EP2010/054784
§ 371 (c)(1),
(2), (4) Date: Nov. 28, 2011

(87) PCT Pub. No.: WO2010/121917
PCT Pub. Date: Oct. 28, 2010

(65) Prior Publication Data
US 2012/0093207 A1    Apr. 19, 2012

(30) Foreign Application Priority Data
Apr. 23, 2009   (GB) .................................. 0907021.0

(51) Int. Cl.
*H04B 1/38*     (2006.01)
*H04L 5/16*     (2006.01)
*G06F 9/445*    (2006.01)

(52) U.S. Cl.
CPC ....................... *G06F 8/61* (2013.01)
USPC ....................................... 375/222

(58) Field of Classification Search
CPC ..................................................... G06Q 20/32
See application file for complete search history.

(56) References Cited

U.S. PATENT DOCUMENTS

| 6,959,330 B1 | 10/2005 | McIlroy |
| 7,099,026 B1 * | 8/2006 | Hren ............................ 358/1.15 |
| 2005/0034119 A1 | 2/2005 | Koyama et al. |
| 2011/0250876 A1 * | 10/2011 | Doherty et al. ............... 455/419 |

FOREIGN PATENT DOCUMENTS

| KR | 20010103722 A | 11/2001 |
| WO | 0231440 A1 | 5/2001 |
| WO | 2010121917 A1 | 10/2010 |

OTHER PUBLICATIONS

PCT International Search Report dated Jul. 5, 2010 for International Application No. PCT/EP2010/054784, 8 pages.

* cited by examiner

*Primary Examiner* — Tanmay Shah

(57) ABSTRACT

The invention provides a method of manufacturing a user equipment comprising a wireless modem, a method of activating a user equipment as a wireless modem, and a corresponding server and user equipment. A processor is produced for executing wireless modem code to operate the processor as a wireless modem, the processor having a writeable, non-volatile memory for storing the wireless modem code but being produced with at least a substantive portion of said wireless modem code not installed on said memory or otherwise, thus rendering the processor inoperative as a wireless modem. The processor is assembled into a user equipment and supplied to an end-user still without the substantive portion of wireless modem code installed. In response to an indication from the end-user requesting activation of the user equipment as a wireless modem, at least said substantive portion of wireless modem code is then distributed to the end-user for installation on the memory the user equipment's processor.

22 Claims, 5 Drawing Sheets

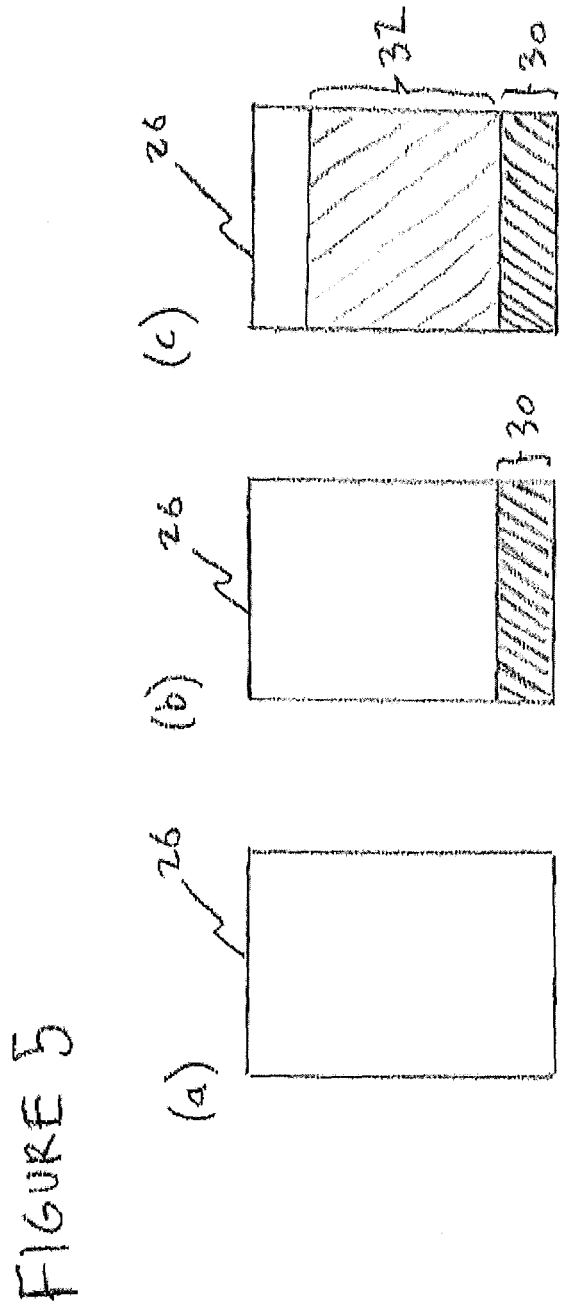

MANUFACTURING PROCESS

CROSS-REFERENCE TO RELATED APPLICATION

This application is National Stage of, and therefore claims the benefit of, International Application No. PCT/EP2010/054784 filed on Apr. 13, 2010, entitled "MANUFACTURING PROCESS," which was published in English under International Publication Number WO 2010/121917 A1 on Oct. 28, 2010, and has a priority date of Apr. 23, 2009, based on application GB 0907021.0. Both of the above applications are commonly assigned with this National Stage application and are incorporated herein by reference in their entirety.

FIELD OF THE INVENTION

The present invention relates to a manufacturing process for producing and activating an end-user product comprising a wireless modem.

BACKGROUND

A user equipment such as a laptop or desktop PC (personal computer) may include a wireless data card for accessing the Internet via a wireless cellular network. The cellular network is the same as that used for voice and data communication by mobile phones; that is, a network comprising a plurality of base stations (or "Node-B"s) each defining a respective cell, and at least one higher-level network element such as radio network controller (RNC) for managing a plurality of such cells in conjunction with one another to provide a joint, coordinated coverage area. By making use of the mobile cellular infrastructure, this allows the PC to connect to the Internet even when no wired modem connection or Wi-Fi hotspot is available.

An example of a laptop PC is illustrated schematically in FIG. 1. The laptop comprises a casing 2 in which is housed a motherboard 4. The motherboard 4 comprises a system bus 5; and a central processing unit (CPU) 6, random access memory (RAM) 8 and input/output (I/O) controller 10 each connected to the system bus 5. The I/O controller 10 connects to input and output devices (not shown) such as to a keyboard, touch pad, and universal serial bus (USB) port for connecting to eternal devices such as an external memory in the form of a dongle.

The casing 2 also houses: a hard drive (H/D) 12, graphics card 14 which connects to a screen (not shown), a sound card 16 for connecting to audio inputs and outputs, a Wi-Fi card 18, and a wireless cellular data card 20, each also connected to the system bus 5. The hard drive 12 stores operating system software and user applications such as a web browser, file system application and word processing application; all of which are arranged to be loaded onto the RAM 8 for execution on the main CPU 6. The Wi-Fi card 18 allows the laptop to connect to the Internet via an external modem and wireless router in the home, office or other venue such as a café. The wireless cellular data card 20 provides an alternative way to connect to the Internet, via a wireless cellular network also used for data and voice communications by mobile phones; e.g. a UMTS (Universal Mobile Telecommunication System) network, and preferably one implementing W-CDMA (Wideband Code Division Multiple Access) radio access technology.

The wireless cellular data card 20 is a circuit board module comprising a processor chip 22 (separate from the PC's main CPU 6) and at least one antenna 24 connected to the processor 22. Alternatively the processor could be provided with a connection to an external antenna. The processor 22 comprises an embedded memory 26 on which is stored software code which when executed by the processor 22 operates it as a wireless cellular modem, thus providing the laptop with access to the Internet via the antenna 24 and the wireless cellular network described above. The software may be referred to as firmware when stored on a memory embedded on the same chip (i.e. integrated circuit) as the processor 22. When executed on the processor 22, the firmware performs much of the low level signal processing required for communication over the wireless cellular network A process flow for manufacturing a user equipment comprising a wireless modem is now described in relation to FIG. 2 (the process is of course duplicated over multiple such equipments, but for illustrative purposes is described here from the perspective of only one equipment). The process begins at step S2 where a chip provider 50 supplies the processor chip 22 to a board producer 52 with the wireless cellular modem firmware installed onto the processor's embedded memory 26, i.e. loaded onto the memory 26 so as to make it available for execution by the processor 22. If the memory 26 is a flash memory, the installed firmware may be said to be "flashed" onto the memory.

Note that the chip provider 50 may have fabricated the chip 22 themselves, or have designed the chip 22 and arranged for its fabrication by a third party fabrication facility, or may have simply sourced the chip 22 from a third party supplier. Similarly, the chip producer 50 may have authored and/or flashed the firmware themselves, or have arranged for one or both of these be done by a third party, or have simply sourced the chips 22 with the firmware ready flashed.

At step S4 the board producer assembles the wireless cellular data card 22 by mounting the processor 22 onto a circuit board along with the antenna 24 and any other connected circuitry, and then supplies the card 22 to a board vendor 54. At step S6 the board vendor 54 supplies the board to a user equipment producer 56 (sometimes referred to as an "original equipment manufacturer", OEM). The board vendor 54 may also perform any required certification of the design of the processor 22 and/or firmware to ensure the design meets any relevant standardisation, and may also perform any required qualification of the design of the processor 22 and/or firmware to ensure the design meets any requirements of the mobile network operator (MNO) 60 of the network(s) for which the wireless cellular data card 20 is intended. The certification and qualification are not done on a per-chip basis, for individual instances of the chip, but rather for the design of the chip and/or firmware: that is, once the design has been certified and qualified, all processors and/or firmware conforming to that design are certified and qualified.

At step S8, the OEM 56 assembles the wireless cellular data card 20 together with the motherboard 4 and any other required components 12, 14, 16 and 18 into the casing 2 to form an end-user product, in this example in the form of a laptop PC, and then supplies the product to an end user 58.

The wireless cellular data card 22 is supplied to the end user 58 in a non-enabled state. Before the end user 58 can have the wireless data card 20 enabled to access the Internet, they must have a suitable account set up with the mobile network operator 60. Therefore at step S10, the end user 58 contacts the MNO 60 to request enablement, and assuming the end user meets certain criteria such as providing valid bank details then at step S12 the MNO 60 sends a response to the end user 58 to enable the wireless data card 20. This response could take the form of mailing a SIM (Subscriber Identity Module) 28 from the MNO 60 to the end-user 58, which can then be inserted into the laptop in order to enable the wireless cellular data card 20. The response may be provided to the end user 58 via the OEM 56.

SUMMARY

According to one aspect of the present invention there is provided a method of manufacturing a user equipment comprising a wireless modem, the method comprising: producing a processor for executing wireless modem code to operate the processor as a wireless modem, the processor having a writeable, non-volatile memory for storing the wireless modem code but being produced with at least a substantive portion of said wireless modem code not installed on said memory or otherwise, thus rendering the processor inoperative as a wireless modem; supplying the processor to a producer of a user equipment, still without at least said substantive portion of wireless modem code installed; assembling the processor into the user equipment, still without at least said substantive portion of wireless modem code installed; supplying the user equipment to an end-user, still without at least said substantive portion of wireless modem code installed; receiving an indication from the end-user requesting activation of the user equipment as a wireless modem; and in response to said indication, distributing at least said substantive portion of wireless modem code to the end-user for installation on the memory of said processor.

In embodiments, the wireless modem may have a physical layer for performing signal processing functions relating to physical properties of a wireless transmission medium, and said substantive portion may comprise at least a part of the physical layer.

The processor may be produced, supplied to the producer of the user equipment, assembled into the user equipment and supplied to the end-user with no wireless modem code installed on said memory or otherwise; and said distribution may comprise distributing the full wireless modem code to the end-user for installation on the memory of said processor.

The receipt of said indication from the end-user may comprise receiving an electronic request signal from said user equipment requesting activation of the user equipment as a wireless modem; and said distribution may comprise transferring at least said substantive portion of wireless modem code to the user equipment.

The request signal may be received via a website accessed from the user equipment over the Internet, and said substantive portion of wireless modem code may be transferred to the user equipment over the Internet.

The processor may comprise a radio front-end; and the method may comprise, prior to supply to the end user in the user equipment, loading said memory with calibration code and executing the calibration code on said processor to calibrate the radio front-end.

Said method may be duplicated multiple times to manufacture a plurality of user equipments from a plurality of respective instances of said processor; and for each of another lesser plurality of user equipments the method may comprise: assembling the user equipment from a respective instance of said processor but with the wireless modem code including said substantive portion installed on said memory, testing the respective instance of the processor by executing the wireless modem code including said substantive portion on that instance of the processor, and supplying the user equipment to the end user with wireless modem code including the substantive portion still installed.

The supply of said processor to the producer of said user equipment may comprise supplying the processor to a producer of a circuit board module for assembly therein, and supplying the assembled circuit board module comprising the processor from the producer of the circuit board module to the producer of the user equipment.

Said indication requesting activation of the user equipment as a wireless modem may be received by a mobile network operator, in response to said indication the may method comprises issuing from the mobile network operator an authorisation response, and said distribution in response to said indication may be performed in response to said authorisation response.

Said substantive portion of wireless modem code may be distributed via the producer of the user equipment.

The method may comprise modifying said substantive portion of wireless modem code before distribution of the processor to the end user but after supply to the producer of at least one of the circuit board module and the user equipment.

Said indication from the end user requesting activation may comprise an indication of a desired variant of the substantive portion of modem code, and said distribution may comprise distributing the desired variant to the end user.

Said method may be duplicated multiple times to manufacture a plurality of user equipments for a plurality of respective end users from a plurality of respective instances of said processor; and the method may comprise maintaining an electronic record of said indications requesting activation received from the end users.

The wireless modem code may comprise wireless cellular modem code to operate the processor as a wireless cellular modem to communicate over a wireless cellular network, said substantive portion of wireless modem code may comprise a substantive portion of the wireless cellular modem code, and said distribution may comprise distributing at least said substantive portion of wireless cellular modem code to the end-user for installation on the memory of said processor.

The wireless modem code may be to operate the processor as a wireless modem for accessing the Internet.

The user equipment may be a PC, e.g. a laptop PC

According to another aspect of the present invention, there is provided a method of manufacturing a user equipment comprising a wireless modem, the method comprising: supplying, to a producer of a user equipment, a processor for executing wireless modem code to operate the processor as a wireless modem, the processor having a writeable, non-volatile memory for storing the wireless modem code but when supplied having at least a substantive portion of said wireless modem code not installed on said memory or otherwise, thus rendering the processor inoperative as a wireless modem; by said supply of the processor, arranging for assembly of the processor into the user equipment and supply of the assembled user equipment to an end-user without said substantive portion of wireless modem code installed; receiving an indication from the end-user requesting activation of the user equipment as a wireless modem; and in response to said indication, distributing at least said substantive portion of wireless modem code to the end-user for installation on the memory of said processor.

According to another aspect of the present invention, there is provided a method of remotely activating a user equipment as a wireless modem, the method comprising: on a server, hosting at least a substantive portion wireless modem code for operating a processor as a wireless modem; receiving an activation request from a user equipment which comprises a processor for the executing wireless modem code to operate the processor as a wireless modem and a writeable, non-volatile memory for storing the wireless modem code but having at least the substantive portion of said wireless modem code not installed on said memory or otherwise, such that at the time of the activation request the user equipment is rendered inoperative as a wireless modem; in response to the activation request, transferring at least said substantive portion of wireless modem code to the user equipment for installation on the memory of said processor.

According to another aspect of the present invention, there is provided a method of an end user activating a user equipment as a wireless modem, the method comprising: obtaining a user equipment comprising a processor for executing wireless modem code to operate the processor as a wireless modem, the processor having a writeable, non-volatile memory for storing the wireless modem code but having at least a substantive portion of said wireless modem code not installed on said memory or otherwise, thus rendering the processor inoperative as a wireless modem; sending, from the end user to a supplier of at least said substantive portion of wireless code, an indication requesting activation of the user equipment as a wireless modem; and as a result of sending said indication, receiving at least said substantive portion of wireless modem code from the supplier and installing it on the memory of said processor.

According to another aspect of the present invention, there is provided a server for remotely activating a user equipment as a wireless modem, wherein: the server hosts at least a substantive portion wireless modem code for operating a processor as a wireless modem; the server is arranged to receive an activation request from a user equipment which comprises a processor for the executing wireless modem code to operate the processor as a wireless modem and a writeable, non-volatile memory for storing the wireless modem code but having at least the substantive portion of said wireless modem code not installed on said memory or otherwise, such that at the time of the activation request the user equipment is rendered inoperative as a wireless modem; the server is programmed to, in response to the activation request, transfer at least said substantive portion of wireless modem code to the user equipment for installation on the memory of said processor.

According to another aspect of the present invention, there is provided a user equipment for activation as a wireless modem by an end user, the user equipment comprising: a processor for executing wireless modem code to operate the processor as a wireless modem, the processor having a writeable, non-volatile memory for storing the wireless modem code but having at least a substantive portion of said wireless modem code not installed on said memory or otherwise, thus rendering the processor inoperative as a wireless modem; wherein the user equipment is operable to transmit, to a server hosting at least said substantive portion of wireless code, a signal requesting activation of the user equipment as a wireless modem; and the user equipment is configured to, as a result of transmitting said signal, receive at least said substantive portion of wireless modem code from the supplier and install it on the memory of said processor.

BRIEF DESCRIPTION OF THE DRAWINGS

As an illustration of the present invention and to show how it may be put into effect, reference is made by way of example to the following drawings in which:

FIG. 5 is a schematic illustration of memory contents at successive stages of manufacture.

DETAILED DESCRIPTION OF PREFERRED EMBODIMENTS

According to a preferred embodiment of the present invention, processor chips 22 for use as soft modems are supplied for manufacture of end-user products such as laptop PCs without any wireless cellular modem firmware flashed or otherwise installed onto the chip, and those products are supplied to the end users in the same state still without the wireless cellular modem firmware installed. When the user has acquired the user equipment in this un-flashed state, they then access an activation server via an alternative communication means such as via Wi-Fi card 18 or a wired Internet connection (not shown) and download the firmware to the processor's embedded memory 26. Thus an initial manufacturing stage of flashing the chips 22 with the firmware is displaced to the end user by means of the activation server.

Figure 1:
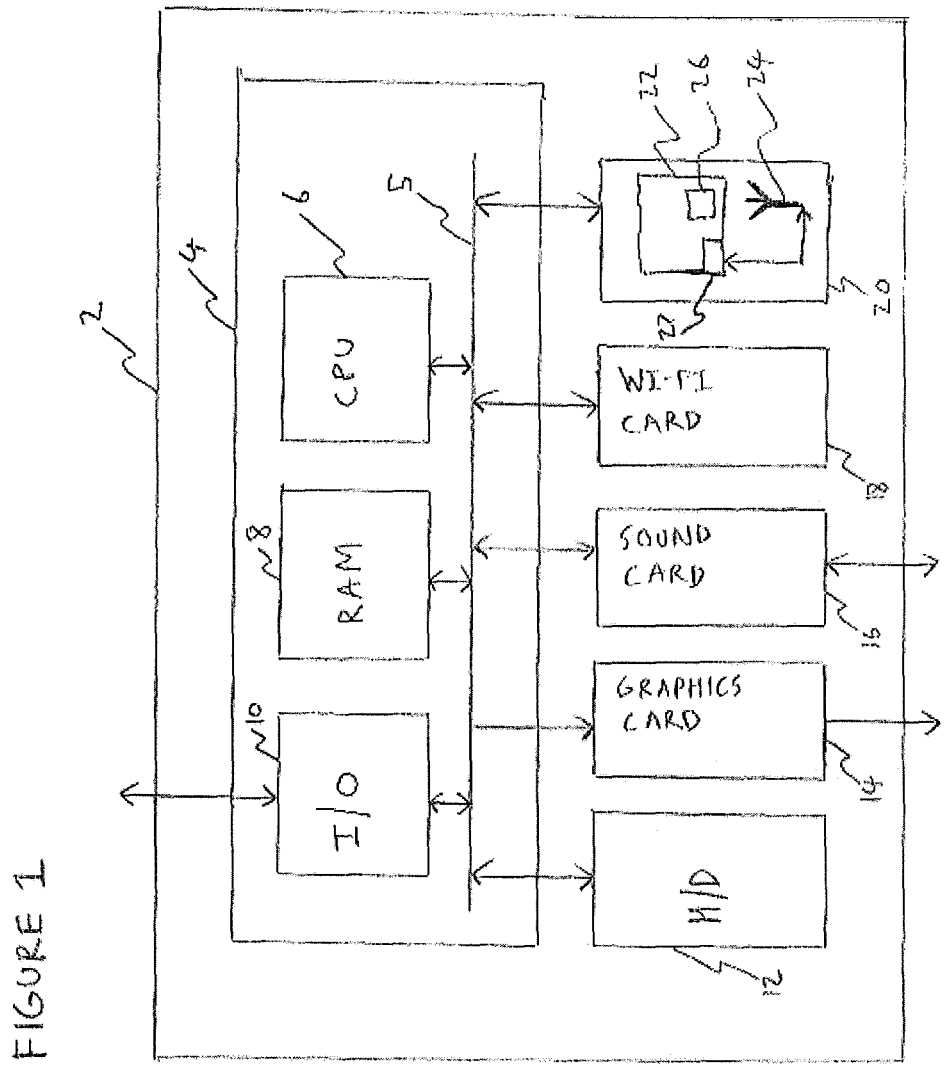
FIG. 1 is a schematic block diagram of a laptop PC.
Figure 2:
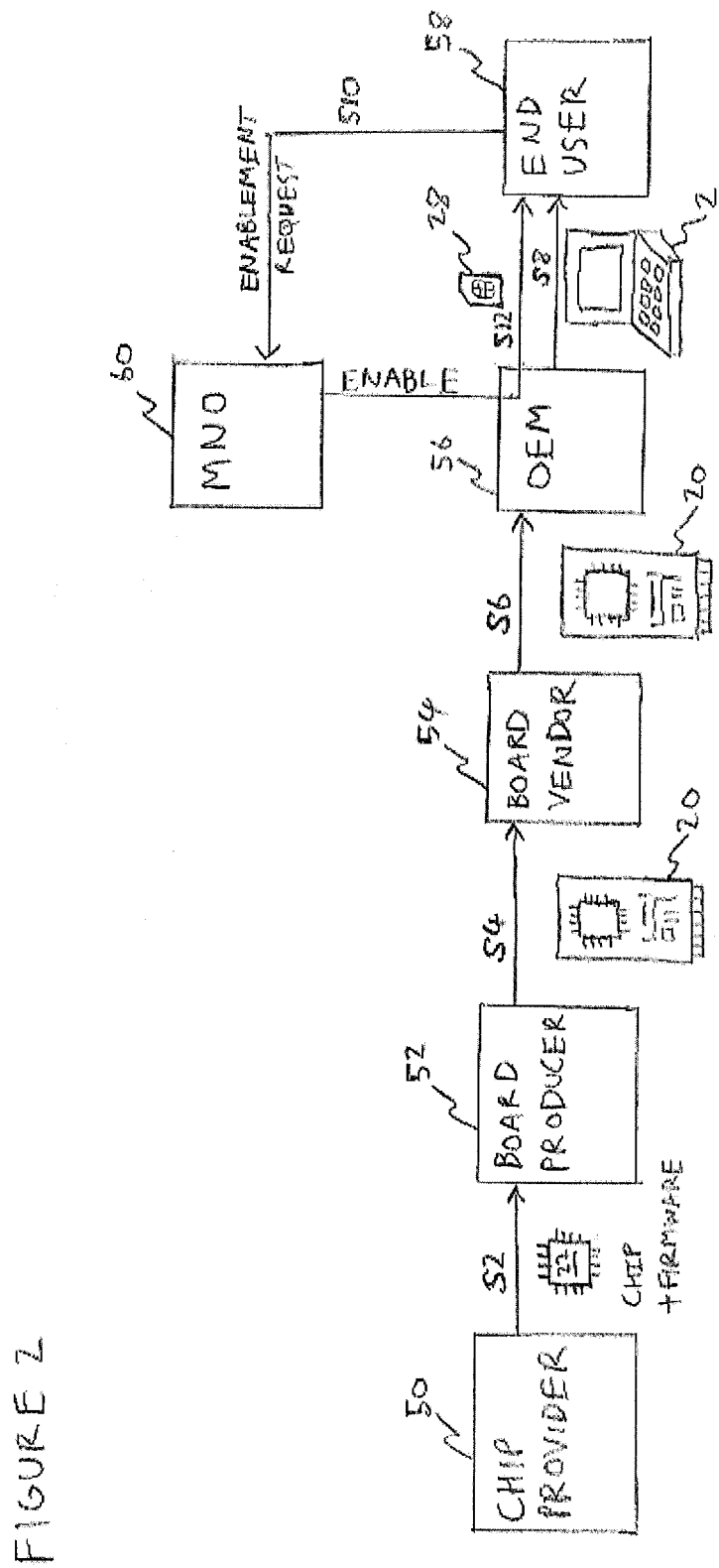
FIG. 2 is a schematic illustration of an existing manufacturing process flow.
Figure 3:
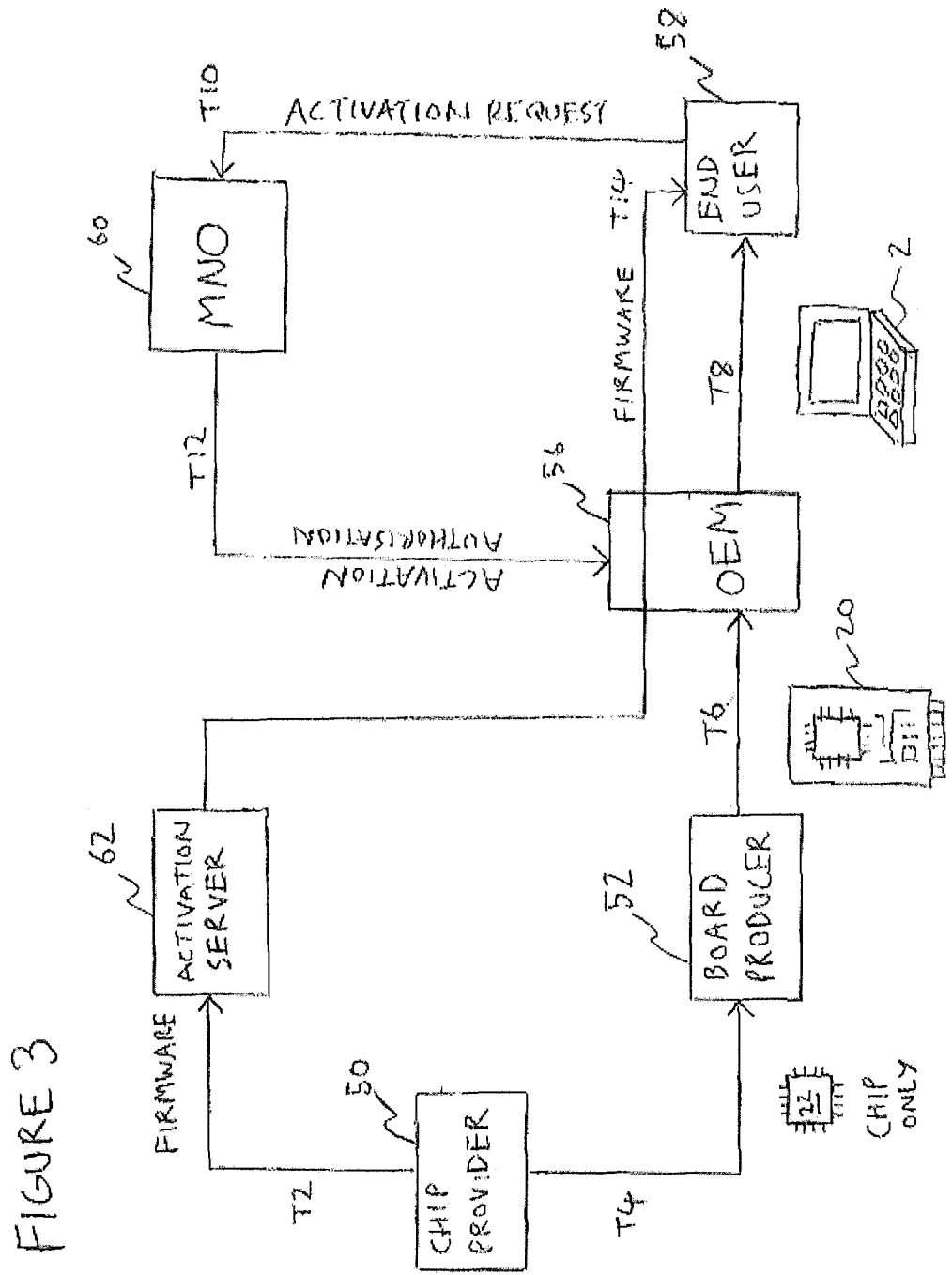
FIG. 3 is a schematic illustration of another manufacturing process flow.

A manufacturing process flow for producing a user equipment according to a preferred embodiment is now described in relation to FIG. 3 (again of course the process is duplicated over multiple user equipments, but for illustrative purpose is described here from the perspective of only one such equipment).

The chip provider 50 obtains a processor chip 22, suitable to be operated as a soft modem, comprising a writeable, non-volatile embedded memory such as a flash memory suitable for storing wireless cellular modem firmware. The chip provider also obtains the relevant firmware, which when executed by the processor 22 will operate it as a wireless cellular modem. As before, the chip provider may have fabricated the chip 22 themselves, or have designed the chip 22 and arranged for its fabrication by a third party fabrication facility, or may have simply sourced the chip 22 from a third party supplier. Similarly, the chip producer 50 may have authored the firmware themselves, or have arranged for this to be done by a third party. In a preferred embodiment, the chip provider 50 authors the firmware and designs the processor chip 22, but arranges for a third party to fabricate the chip 22.

The idea behind a soft modem is to move a significant portion of the signal processing involved in wireless communications out of dedicated hardware and into firmware or other software to be run on a programmable, reconfigurable processor. However, note that not all functions of the modem need necessarily be performed in firmware or other software. In a preferred embodiment, the chip 22 is to be operated as a soft baseband modem: that is, on the receive side all functionality up to and including mixing down to baseband are implemented in a dedicated hardware front-end 27 which may be comprised on the chip 22, and on the transmit side all functionality from mixing up from baseband to intermediate and radio frequencies onwards are also implemented in the dedicated hardware front-end; but all functionality in the baseband domain are implemented in the firmware executed on the processor 22. A such, the processor chip 22 may comprise dedicated hardware units such as an analogue to digital converter, digital to analogue converter, filters, amplifiers and mixers. Such components will be familiar to a person skilled in the art.

Preferably, at least part of the physical layer is implemented in the firmware. The physical layer is the mechanism that handles the transmission and reception of data on the level of individual bits (or more generally elementary symbols, e.g. in the case of quadrature or higher phase-shift keying) rather than a higher level of abstraction. The physical layer is concerned with how to actually place a bit or symbol onto a transmission medium and how to receive a bit or symbol from that medium. That is, the physical layer performs signal processing related to the physical properties of the transmission medium. For example, in preferred embodiments of the present invention, the physical layer firmware may include algorithms for performing equalisation or rake processing of received signals, algorithms for performing at least part of the modulation and demodulation of the transmitted and received signals respectively, and/or algorithms for performing code division multiple access (CDMA) spreading and despreading.

Figure 4:
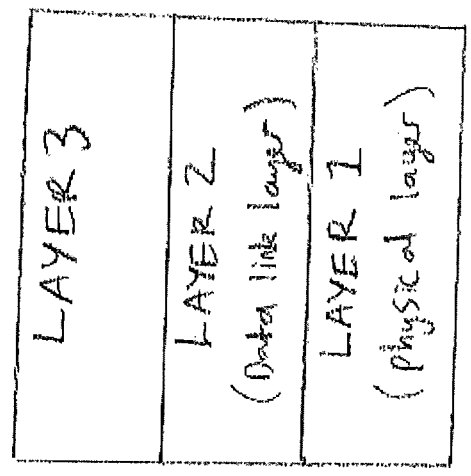
FIG. 4 is a schematic illustration of a protocol stack.

In the GSM model for example, as shown in FIG. 4 the protocol stack is modelled broadly as comprising three basic layers, termed Layer 1, Layer 2 and Layer 3. At the lowest hierarchical level is Layer 1, which is the physical layer as described above. The next hierarchical level is Layer 2, which is the data link layer. This involves protocols for establishing and maintaining a connection between the transmitting and receiving terminals, and the communication of meaningful data therebetween; e.g. formatting data into frames, acknowledging receipt of data, and error correction. Notably, Layer 2 is concerned with end-to-end connection between two (or more) terminals, whereas Layer 1 is only concerned with the immediate interface between one terminal and the physical transmission medium. Further, Layer 2 is concerned with the transmission and reception of meaningful data, whereas at Layer 1 the individual bits or symbols in themselves have no immediate meaning.

At the highest hierarchical level, Layer 3 then provides higher level network management functions. These include mobility management, e.g. handover, paging, registration (functions relating to movement between cells). Layer 3 functions also include resource management; e.g. power control and quality-of-service (QoS) (functions relating to allocation of resources). The Layer 3 functions further include connection management.

In contrast with Layers 2 and 3, the physical layer does not consider protocols relating to end-to-end transmission of data nor perform high level network management functions.

At step T2 the chip provider 50 supplies a copy of the firmware to an activation server 62, either by physically sending a copy on a storage medium or transferring a copy over a network or other communications link. At step T4, the chip provider 50 supplies the processor chip 22 to the board producer 52, but notably without any wireless cellular modem firmware flashed onto the chip's embedded memory 26, and without any other such software being installed on the processor 22 by any other means. The processor chips 22 are preferably supplied completely blank, with no firmware or other software installed whatsoever. This is illustrated schematically in FIG. 5(a), where the memory 26 is shown having no content.

Note that when it is said the chip provider 50 obtains and supplies the firmware and/or processor chip 22 to the relevant party, this could include the possibility that the chip provider 50 obtains the rights to the firmware and/or chip 22 as appropriate and arranges for the supply from source to the relevant party. In the preferred embodiment where the chip provider 50 designs the chip 22 and arranges for its fabrication by a third party, this could include supplying the chips 22 directly from the fabrication facility to the board producer 52 without passing via a facility or premises of the chip provider 50.

At step T6, the board producer 52 assembles the processor 22 together with the antenna 24, front-end hardware 27 and any other connected circuitry onto a wireless cellular data card 20 and provides it to the OEM 56. Throughout this stage the wireless cellular modem firmware remains un-flashed onto the chip 22. However, the board producer 54 will typically need to perform some calibration. To that end, the board producer 54 may as part of at step T6 flash factory calibration software onto the memory 26 of each processor chip 22. The factory calibration software comprises driver code to control and calibrate the radio system of the chip's front-end 27, e.g. to calibrate power amplifier parameters. As part of step T6, the board producer may also flash the memory 26 with a command interpreter, and with flash memory download code which allows the full modem code to be downloaded at a later date (as will be discussed below). However, none of this basic code flashed at this stage amounts to a wireless software modem. It is not sufficient in itself to operate a processor 22 to perform the signal processing required to communicate over a cellular network, and does not include the physical layer. This initial portion of basic, non-modem code is shown schematically in FIG. 5(b) by the portion 30 in memory 26.

Further, for quality control purposes, as part of step T6 it may be necessary for the board producer 54 to flash a small fraction of the chips 22 it uses in making the wireless data cards 20 with the full wireless cellular modem firmware for testing purposes. Preferably this small fraction may be of the order of one in every thousand chips 22. For these one-in-a-thousand chips 22, the wireless cellular modem code may be left flashed, but the majority of the chips 22 remain substantially un-flashed.

At step T8, the OEM 56 assembles the wireless data card 20 along with components such as a motherboard 4, etc. into an end-user product ready for sale to an end-user 58. In one preferred embodiment this end-user product is a laptop PC. The end-user product is supplied to the end user 58 in a state suitable for use by the end user 58 in some respects, having some functionality such as a word processing application, a file system application, a web browser application, and access to the Internet via a Wi-Fi card 18 and external wireless router or via a wired internet connection (not shown). These applications are stored on the hard drive 12 so as to be loadable onto the RAM 8 for execution on the main CPU 6. However, the end user product is supplied to the end user still without any wireless cellular modem firmware flashed onto the memory 26 of the processor 22 or any other such wireless cellular modem software being otherwise installed (barring the one in a thousand flashed for testing purposes). That is, although the user applications to be run on the main CPU 6 may be present on the hard drive 12, the firmware for performing low level signal processing when run on the wireless cellular data card's processor 22 is deliberately omitted. So referring to the FIG. 5, the memory 26 is supplied to the end user 58 still in the state shown in FIG. 5(b). Thus the wireless cellular data card 20 is at this stage rendered inoperative as a wireless modem.

The end user 58 can then select to activate the wireless cellular data card 20. To do this, at step T10 they send an activation request to the mobile network operator (MNO) 60 indicating the required activation. This could be achieved by hosting a website on a server of the MNO 60 that the user can access via an alternative Internet connection such as via the Wi-Fi card 18 and external wireless router or via a wired Internet connection (not shown). The end user 58 then fills in an online form and thereby submits an electronic request signal comprising details such as name, address and bank details to the MNO 60. Once the request is validated, the MNO's server 60 generates an activation authorisation response signal at step T12. In embodiments, this response signal may be transmitted to a computer system of the OEM 56. The OEM's system 56 may be connected as a gateway to the activation server 62, and once the authorisation signal has been received by the OEM's system 56 then the end-user 58 will be authorised to download the wireless cellular modem firmware from the activation server 62 to the memory 26 embedded on the processor 22 of the wireless cellular data card 20 on their user equipment. Therefore not until downloaded by the end user 58 is the full modem code installed on memory 26, as represented by the portion 32 in the final stage illustrated schematically in FIG. 5(*c*).

Alternatively, the end user could transmit the electronic activation request signal from their user equipment directly to the activation server 62, with the authority to authorise end users' accounts being deferred to the operators of the activation server 62 from the MNO 60; and/or the activation server 62 could download the required firmware to the end user's equipment directly without involvement of the OEM 56. Further, although electronic requests and download of the firmware are preferred, other methods such as postal or telephone requests or distribution of the firmware by a CD or memory dongle are not necessarily excluded.

The MNO may mail a SIM card to the user, although in embodiments that need not be necessary to activate the soft modem. Alternatively a SIM card or similar could be provided with the purchased user equipment, or the user could just buy the activation completely electronically (e.g. completely online) or by other means.

In a preferred embodiment, at least one of the certification and qualification of the design of the processor 22 and/or wireless cellular modem firmware is performed by the operator or proprietor of the activation server 62, or at least the party arranging for the hosting of the wireless cellular modem firmware on the activation server 62.

In embodiments, the activation process may be used to enable the chip provider's customers (e.g. the board producer 54 or OEM 56) to decide on device capabilities late in the manufacturing process. That is, the functionality of the modem firmware need not be fixed at the time of supplying the chip 22 to the board producer 54 or OEM 56, but can be re-written or modified to update it at any time up to the distribution to the end user 58.

Further, the activation process may used to enable the end user 58 to select a desired performance or other variant of their wireless cellular modem. In that case, the activation server 62 may store multiple variants of the wireless cellular modem firmware, and the user's activation request signal at step T10 may include an indication of the preferred variant. In response, the relevant variant can be downloaded to the end user's equipment.

Further, the activation requests may be recorded along with details of the requesting user, e.g. at the activation server 62 or at the MNO 60. This may allow tracking of activations.

It will be appreciated that the above embodiments have been described only by way of example. In other embodiments for example, the memory for storing the wireless modem software code need not be embedded on the same chip as the processor 22, but could be an external memory associated with the processor for assembling into the same user equipment; and further the memory could be of another type than a flash memory. Further, although the above has been described in terms of a wireless cellular modem for accessing the Internet via a cellular network, other types of wireless modems using other types of network could also be implemented. Further, although the above has been described in terms of no wireless modem firmware being installed on the processor until activation by the user, in other embodiments the chips 22 may be supplied with only a substantive portion of the firmware missing leaving only that portion to be later installed by the user. The missing portion is substantive in that without it the wireless modem is rendered inoperative. In such embodiments, the substantive missing portion preferably comprises at least a part of the physical layer, and in the most preferable embodiments the product is shipped devoid of as much of the physical layer as possible, ideally with the entire soft physical layer missing. Further, although the chip provider 50, board producer 52, OEM 56, MNO 60 and activation server 62 are preferably each implemented by different parties each at different respective site or sites, one or more of these functions may alternatively be implemented by the same party and/or at the same site. Other applications and configurations of the present invention may be apparent to a person skilled in the art given the disclosure herein. The scope of the present invention is not limited by the embodiments described herein, but only by the following claims.

The invention claimed is:

1. A method of manufacturing a user equipment comprising a wireless modem, the method comprising:

producing a processor for executing wireless modem code to operate the processor as a wireless modem, the processor having a writeable, non-volatile memory for storing the wireless modem code but being produced with at least a substantive portion of said wireless modem code not installed on said memory or otherwise, thus rendering the processor inoperative as a wireless modem;

supplying the processor to a producer of a user equipment, still without at least said substantive portion of wireless modem code installed;

assembling the processor into the user equipment, still without at least said substantive portion of wireless modem code installed;

supplying the user equipment to an end-user, still without at least said substantive portion of wireless modem code installed;

receiving an indication from the end-user requesting activation of the user equipment as a wireless modem; and in response to said indication, distributing at least said substantive portion of wireless modem code to the end-user for installation on the memory of said processor.

2. The method of claim 1, wherein the wireless modem has a physical layer for performing signal processing functions relating to physical properties of a wireless transmission medium, and said substantive portion comprises at least a part of the physical layer.

3. The method of claim 1, wherein: the processor is produced, supplied to the producer of the user equipment, assembled into the user equipment and supplied to the end-user with no wireless modem code installed on said memory or otherwise; and said distribution comprises distributing the full wireless modem code to the end-user for installation on the memory of said processor.

4. The method of claim 1, wherein: the receipt of said indication from the end-user comprises receiving an electronic request signal from said user equipment requesting activation of the user equipment as a wireless modem; and said distribution comprises transferring at least said substantive portion of wireless modem code to the user equipment.

5. The method of claim 4, wherein the request signal is received via a website accessed from the user equipment over the Internet, and said substantive portion of wireless modem code is transferred to the user equipment over the Internet.

6. The method of claim 1, wherein the processor comprises a radio front-end; and the method comprises, prior to supply to the end user in the user equipment, loading said memory with calibration code and executing the calibration code on said processor to calibrate the radio front-end.

7. The method of claim 1, wherein said method is duplicated multiple times to manufacture a plurality of user equipments from a plurality of respective instances of said processor; and for each of another lesser plurality of user equipments the method comprises: assembling the user equipment from a respective instance of said processor but with the wireless modem code including said substantive portion installed on said memory, testing the respective instance of the processor by executing the wireless modem code including said substantive portion on that instance of the processor, and supplying the user equipment to the end user with wireless modem code including the substantive portion still installed.

8. The method of claim 1, wherein the supply of said processor to the producer of said user equipment comprises supplying the processor to a producer of a circuit board module for assembly therein, and supplying the assembled circuit board module comprising the processor from the producer of the circuit board module to the producer of the user equipment.

9. The method of claim 1, wherein: said indication requesting activation of the user equipment as a wireless modem is received by a mobile network operator, in response to said indication the method comprises issuing from the mobile network operator an authorisation response, and said distribution in response to said indication is performed in response to said authorisation response.

10. The method of claim 1, wherein said substantive portion of wireless modem code is distributed via the producer of the user equipment.

11. The method of claim 1, comprising modifying said substantive portion of wireless modem code before distribution of the processor to the end user but after supply to the producer of at least one of the circuit board module and the user equipment.

12. The method of claim 1, wherein said indication from the end user requesting activation comprises an indication of a desired variant of the substantive portion of modem code, and said distribution comprises distributing the desired variant to the end user.

13. The method of claim 1, wherein said method is duplicated multiple times to manufacture a plurality of user equipments for a plurality of respective end users from a plurality of respective instances of said processor; and the method comprises maintaining an electronic record of said indications requesting activation received from the end users.

14. The method of claim 1, wherein: the wireless modem code comprises wireless cellular modem code to operate the processor as a wireless cellular modem to communicate over a wireless cellular network, said substantive portion of wireless modem code comprises a substantive portion of the wireless cellular modem code, and said distribution comprises distributing at least said substantive portion of wireless cellular modem code to the end-user for installation on the memory of said processor.

15. The method of claim 1, wherein the wireless modem code is to operate the processor as a wireless modem for accessing the Internet.

16. The method of claim 1, wherein the user equipment is a PC.

17. The method of claim 16, wherein the PC is a laptop PC.

18. A method of manufacturing a user equipment comprising a wireless modem, the method comprising:
supplying, to a producer of a user equipment, a processor for executing wireless modem code to operate the processor as a wireless modem, the processor having a writeable, non-volatile memory for storing the wireless modem code but when supplied having at least a substantive portion of said wireless modem code not installed on said memory or otherwise, thus rendering the processor inoperative as a wireless modem;
by said supply of the processor, arranging for assembly of the processor into the user equipment and supply of the assembled user equipment to an end-user without said substantive portion of wireless modem code installed;
receiving an indication from the end-user requesting activation of the user equipment as a wireless modem; and
in response to said indication, distributing at least said substantive portion of wireless modem code to the end-user for installation on the memory of said processor.

19. A method of remotely activating a user equipment as a wireless modem, the method comprising:
on a server, hosting at least a substantive portion wireless modem code for operating a processor as a wireless modem;
receiving an activation request from a user equipment which comprises a processor for the executing wireless modem code to operate the processor as a wireless modem and a writeable, non-volatile memory for storing the wireless modem code but having at least the substantive portion of said wireless modem code not installed on said memory or otherwise, such that at the time of the activation request the user equipment is rendered inoperative as a wireless modem; and
in response to the activation request, transferring at least said substantive portion of wireless modem code to the user equipment for installation on the memory of said processor.

20. A method of an end user activating a user equipment as a wireless modem, the method comprising:
obtaining a user equipment comprising a processor for executing wireless modem code to operate the processor as a wireless modem, the processor having a writeable, non-volatile memory for storing the wireless modem code but having at least a substantive portion of said wireless modem code not installed on said memory or otherwise, thus rendering the processor inoperative as a wireless modem;
sending, from the end user to a supplier of at least said substantive portion of wireless code, an indication requesting activation of the user equipment as a wireless modem; and
as a result of sending said indication, receiving at least said substantive portion of wireless modem code from the supplier and installing it on the memory of said processor.

21. A server for remotely activating a user equipment as a wireless modem, wherein:
the server hosts at least a substantive portion wireless modem code for operating a processor as a wireless modem;
the server is arranged to receive an activation request from a user equipment which comprises a processor for the executing wireless modem code to operate the processor as a wireless modem and a writeable, non-volatile memory for storing the wireless modem code but having at least the substantive portion of said wireless modem code not installed on said memory or otherwise, such that at the time of the activation request the user equipment is rendered inoperative as a wireless modem; and
the server is programmed to, in response to the activation request, transfer at least said substantive portion of wireless modem code to the user equipment for installation on the memory of said processor.

22. A user equipment for activation as a wireless modem by an end user, the user equipment comprising:
- a processor for executing wireless modem code to operate the processor as a wireless modem, the processor having a writeable, non-volatile memory for storing the wireless modem code but having at least a substantive portion of said wireless modem code not installed on said memory or otherwise, thus rendering the processor inoperative as a wireless modem;
- wherein the user equipment is operable to transmit, to a server hosting at least said substantive portion of wireless code, a signal requesting activation of the user equipment as a wireless modem; and
- the user equipment is configured to, as a result of transmitting said signal, receive at least said substantive portion of wireless modem code from the supplier and install it on the memory of said processor.

* * * * *